United States Patent

Mimnagh et al.

[11] Patent Number: 6,118,741
[45] Date of Patent: Sep. 12, 2000

[54] METHOD AND DEVICE FOR RECORDING INFORMATION ON A CARRIER

[76] Inventors: Winslow M. Mimnagh; Jakob G. Nijboer, both of Prof. Holstlaan 6, 5656 AA Eindhoven, Netherlands

[21] Appl. No.: 09/078,820

[22] Filed: May 14, 1998

[30] Foreign Application Priority Data

Jun. 19, 1997 [EP] European Pat. Off. .............. 97201869

[51] Int. Cl.[7] .................................................. G11B 7/00
[52] U.S. Cl. ............................................ 369/47; 369/116
[58] Field of Search .................. 369/47, 48, 59, 369/58, 54, 116

[56] References Cited

U.S. PATENT DOCUMENTS

| | | | |
|---|---|---|---|
| 5,867,462 | 2/1999 | Tholen et al. .............................. | 369/48 |
| 5,881,037 | 3/1999 | Tanaka et al. ............................. | 369/48 |
| 5,896,355 | 4/1999 | Sako et al. ................................ | 369/47 |
| 5,920,529 | 7/1999 | Ota et al. .................................. | 369/47 |
| 5,923,627 | 7/1999 | Miwa et al. ............................... | 369/47 |
| 5,930,209 | 7/1999 | Spitzenberger et al. .................. | 369/47 |
| 5,933,398 | 8/1999 | Fujinami .................................. | 369/47 |
| 5,999,505 | 12/1999 | Yasui ........................................ | 369/48 |

*Primary Examiner*—Nabil Hindi
*Attorney, Agent, or Firm*—Michael E Belk

[57] ABSTRACT

A method of digitally recording information on a suitable medium, particularly a CD is described, in which method a recording is made during a recording session. The recording includes a program portion with the information to be recorded. Prior to recording the program portion, a predetermined number of run-in blocks is recorded, and subsequent to recording the program portion, a predetermined number of run-out blocks is recorded. During the recording session, an identification code identifying the recording apparatus used for the relevant recording session is recorded on the medium. The identification code is recorded in at least one of the run-in blocks and run-out blocks. This provides the possibility of recording a full identification code, even in the case of relatively short recordings.

12 Claims, 2 Drawing Sheets

METHOD AND DEVICE FOR RECORDING INFORMATION ON A CARRIER

The invention generally relates to recording information on a carrier, particularly on a compact disc, hereinafter referred to as CD.

Within the scope of the present invention, the term "information" is to be understood to have a wide meaning: it refers to any form of information, not only data files but also, for example audio or video information.

Although the present invention is particularly important in CD recording, those skilled in the art will readily understand that the invention is not limited thereto and that it may also be useful for recording on other media such as, for example DVD. However, the invention will hereinafter be elucidated specifically for use in CD recording.

The recording of information may be roughly divided into two categories: on the one hand, producer recording and, on the other hand, consumer recording. Producer recording is concerned, for example when a manufacturer produces a music recording on a carrier in large numbers and markets these carriers via the normal channels; an end user (consumer) may buy such a CD in a shop and play it on his playback installation. Consumer recording is concerned when a consumer himself possesses a recording apparatus with which he can make recordings.

Consumer recording is a long-existing phenomenon which is very important in the audio industry. It enables a consumer to record his favourite music in a sequence determined by himself, using, for example a radio receiver, a gramophone record, etc. as a source. The consumer may make use of a magnetic tape (tape-reel recorder or cassette recorder) as a recording medium. In principle, the recording may infringe upon copyright laws. Since conventional recording systems are based on analog recording techniques, with some loss of quality always occurring, its use will usually be limited to private circumstances and improper use will generally take place on a small scale.

Recently, apparatuses with which digital recording is possible, for example on magnetic tape or on CDs have been introduced on the consumer market. Particularly, the consumer is offered the relatively novel facility of using a CD as a recording medium. As digital recording techniques are used, these CDs have such a high quality that there is a non-negligible risk of abuse in the form of large-scale piracy. Moreover, this technique provides the possibility of copying computer programs and, also in this field, abuse (illegal copying) is undesirable.

For these reasons, CD recording equipment intended for the consumer market is designed in such a way that, when recording a CD, also a unique apparatus-specific code is written with which the relevant recording apparatus can be recognized. If an illegal recording is discovered, it is then possible to retrieve the apparatus with which this recording has been made. This code is denoted as RID code (Recorder IDentification code).

The present invention particularly relates to the way in which the RID code is recorded.

As will hereinafter be explained in greater detail, the RID code has hitherto been interleaved with the actual information. This implies that information must be recorded uninterruptedly for a relatively long time when writing a full RID code. This is no drawback in the case of audio recording because a sequence of minimally several seconds and usually several minutes will always be recorded. However, this is a drawback in the case of data recording in which there is a need to have the facility of a relatively short recording length.

An important object of the present invention is to provide a solution to this problem, which solution is preferably compatible with the existing method.

As is known to those skilled in the art, it is necessary to use an error correction method in digital recording operations, with which method erroneously written or read bits can be "repaired". In the currently used error correction method, a predetermined number of consecutive bytes is considered in combination. To ensure that also the first and last bits of a recording are checked and can possibly be corrected, a number of run-in blocks is recorded prior to the actual recording session and a number of run-out blocks is recorded subsequent to the actual recording session. As is known, the run-in blocks also serve as "capture" blocks for a reading apparatus with which the recording is read. For example, the clock of the reading apparatus is captured by means of these blocks and, for example, the decoder is synchronized so that correct reading directly takes place when the read head of the reading apparatus reaches the beginning of the first data block.

Although these run-in and run-out blocks are necessary to enable a reading apparatus to read the actual recording satisfactorily, the information contents of said run-in and run-out blocks do not have a function in this case. The present invention is based on the recognition that said blocks represent a quantity of storage space necessarily associated with each recording, which space has hitherto been unused, and that these blocks are eminently suitable for recording information relating to the actual recording and/or the recording apparatus.

In accordance with an important aspect of the present invention, the RID code is therefore recorded in at least one of the run-in and/or run-out blocks.

All run-in and run-out blocks are preferably written in an identical manner.

These and other aspects of the invention are apparent from and will be elucidated with reference to the embodiments described hereinafter.

Recording information on a CD is already known in practice. The format used will hereinafter be elucidated with reference to FIGS. 1A–1D.

Figure 1:
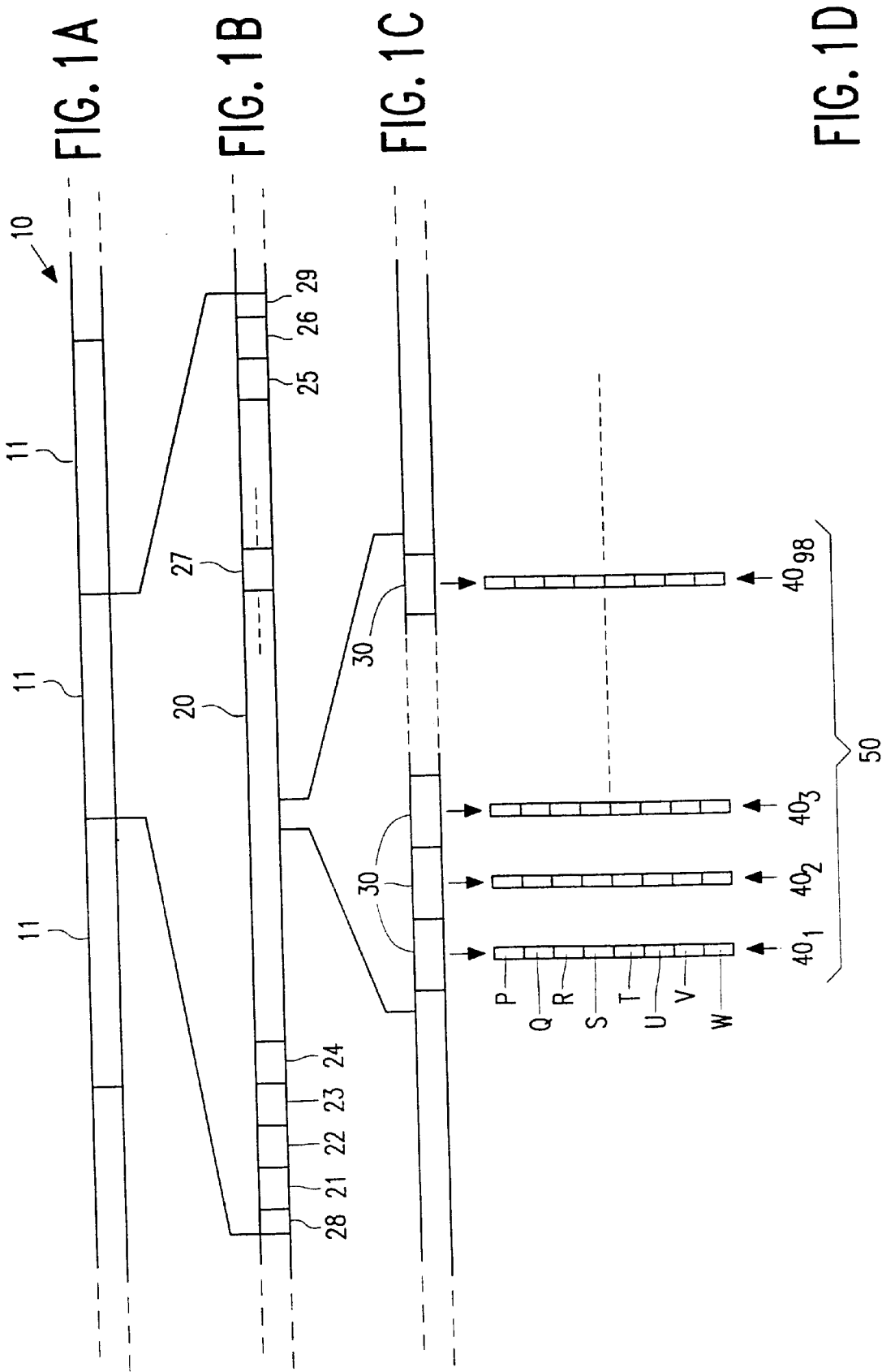
FIG. 1 shows diagrammatically the structure of recording information on a CD.

FIG. 1 shows diagrammatically the structure of recording information on a CD. Since the way in which this recording is physically brought about is not a subject of the present invention and since knowledge of this recording mode is not necessary to those skilled in the art for understanding the present invention, and is also known per se, this subject will not be described any further.

In FIG. 1A, the recording of information on a CD is represented as a linear track 10. It will be evident to those skilled in the art that the CD recording actually has the shape of a circular or spiral pattern. The track 10 may be written during a single writing session, but it is alternatively possible, as illustrated in FIG. 1A, that the track 10 is written during a plurality of mutually independent writing sessions, while, in principle, it is possible that a different recording apparatus was active during each writing session. The part of the track 10 written during a single session will hereinafter be referred to as recording 11.

FIG. 1B is a diagrammatic illustration on a larger scale of a part of the track 10 shown in FIG. 1A, and illustrates that each recording 11 comprises a program portion 20 having a length which is, in principle, unlimited (of course within the limits of possibilities of the CD). FIG. 1C illustrates on a larger scale a part of the program portion 20 shown in FIG. 1B and illustrates that the program portion 20 is subdivided into successive program frames 30. Each program frame 30 comprises 32 8-bit bytes relating to the actual recorded information, and one extra 8-bit byte 40 which is referred to as sub-code byte. Of said 32 8-bit bytes, 24 bytes carry the actual recorded information and can therefore be referred to as information bytes, while the other 8 bytes are added for an error-correcting code and can therefore be referred to as correction bytes. The sub-code byte 40 is used for recording additional information, as will be explained hereinafter.

FIG. 1D shows diagrammatically the sub-code byte 40 incorporated in each program frame 30 shown in FIG. 1C. The 8 bits of a sub-code byte 40 are successively denoted by the letters P, Q, R, S, T, U, V, W, as is shown in FIG. 1D. 98 Consecutive sub-code bytes $40_1$ to $40_{98}$, corresponding to 98 consecutive program frames 30, jointly constitute a sub-code frame 50 which defines a full cycle of sub-code information.

Figure 2:
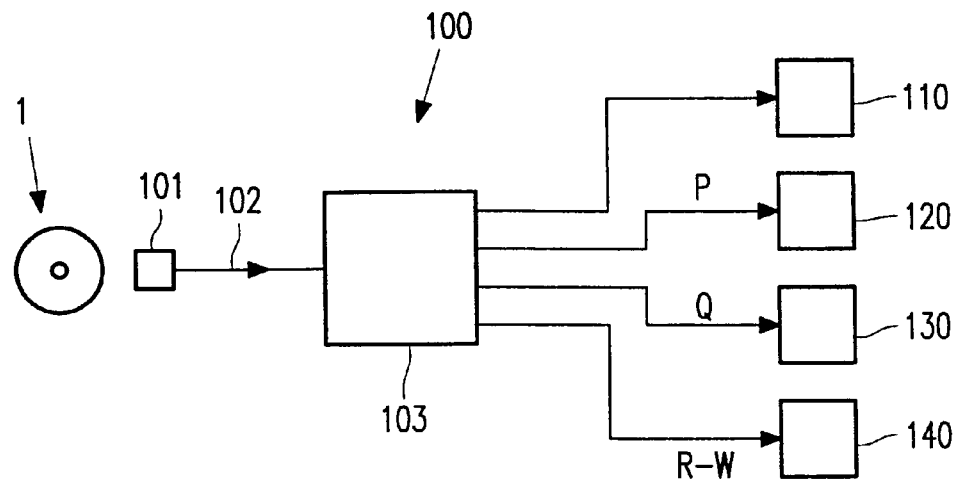
FIG. 2 shows diagrammatically the data processing in a reading apparatus.

FIG. 2 illustrates diagrammatically how the information read from a CD 1 is processed in a CD reading apparatus 100. A reading member 101 applies a signal 102 to a signal-selecting member 103, which signal represents the consecutive program frames 30.

The CD reading apparatus 100 has a first signal-processing channel 110 for "normal" processing of the actual recorded information such as the reproduction of music. The signal-selecting member 103 applies the 32 information bytes of the program frames 30 to this first signal-processing channel 110.

The CD reading apparatus 100 has a second signal-processing channel 120 which is referred to as P-channel for processing the information represented by the P-bits of the sub-code bytes 40. The CD reading apparatus 100 has a third signal-processing channel 130 which is referred to as Q-channel for processing the information represented by the Q-bits of the sub-code bytes 40. The CD reading apparatus 100 has a fourth signal-processing channel 140 which is referred to as R-W-channel for processing the information represented by the bits R-W in combination. To this end, the signal-selecting member 103 directs the P-bits from the program frames 30 to the P-channel 120, the Q-bits from the program frames 30 to the Q-channel 130 and the other bits from the sub-code bytes 40 to the R-W-channel 140.

The 98 consecutive P-bits $P_1$ to $P_{98}$ of a sub-code frame 50 define a P-frame. The 98 consecutive Q-bits Q, to $Q_{98}$ of a sub-code frame 50 define a Q-frame. The 588 bits $R_1$ to $W_{98}$ of a sub-code frame 50 define a R-W-frame. It is here stated by way of example that the P-frames comprise information marking the regions on a CD between the tracks, the run-in region of the disc, the run-out region of the disc and the like. For example, a table of contents of a disc can be stored by means of the Q-frames in the run-in region of the disc, while the Q-frames associated with a recording may comprise the track number and the playing time. The R-W-channel is intended for text and graphics.

Figure 3:
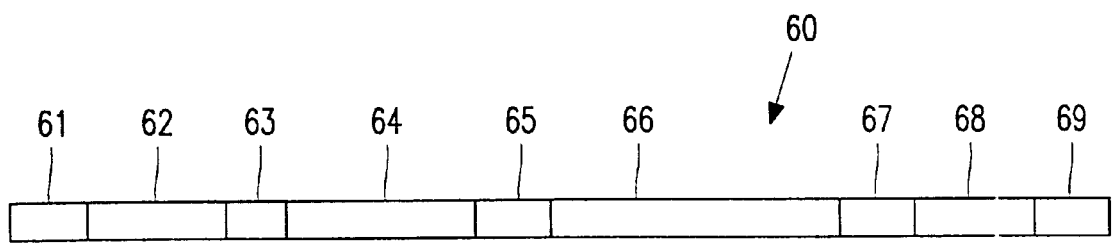
FIG. 3 shows diagrammatically the structure of a Q-byte.

FIG. 3 illustrates diagrammatically the content of a Q-frame generally denoted by the reference numeral 60, as defined by the 98 consecutive Q-bits $Q_1$ to $Q_{98}$ of a sub-code frame 50. Each Q-frame 60 comprises 9 frame portions 61 to 69. The first frame portion 61 comprises 2 synchronization bits. The second frame portion 62 comprises 4 control bits indicating whether the recorded information is audio information or data information. The third frame portion 63 comprises 4 mode bits indicating the mode in which the relevant Q-frame 60 is used.

In mode 3, the other frame portions have the following significance.

The seventh frame portion 67 comprises four bits which are equal to zero. The eighth frame portion 68 comprises 8 bits representing the frame value of the absolute time. The ninth frame portion 69 comprises 16 bits for an error correction code (CRC).

The fourth frame portion 64 and the sixth frame portion 66 comprise 30 bits and 28 bits, respectively, having a significance which is defined by the content of the fifth frame portion 65 which comprises two bits. If the content of the fifth frame portion 65 is equal to 00, the 58 bits of the fourth frame portion 64 and the sixth frame portion 66 represent the International Standard Recording Code (ISRC), which is a unique code for each piece of music. If the content of the fifth frame portion 65 is equal to 01, the 58 bits of the fourth frame portion 64 and the sixth frame portion 66 represent a code which has not yet been defined but is reserved for future use and is therefore referred to as TBD code (To Be Defined). The value 10 for the fifth frame portion 65 is not used.

If the content of the fifth frame portion 65 is equal to 11, the 58 bits of the fourth frame portion 64 and the sixth frame portion 66 represent the RID code. The known RID code is built up as follows. The first 18 bits define three alphanumerical characters which are coded in accordance with a 6-bit code and jointly define a manufacturer code representing the name of the manufacturer of the recording apparatus with which the relevant recording has been written. The subsequent 20 bits define two alphanumerical characters which are also coded in accordance with said 6-bit code, and two figures which are coded in accordance with a 4-bit BCD code and jointly define a type code representing the type of the recording apparatus with which the relevant recording has been written. The last 20 bits jointly define a binary number, with the MSB first, without a sign, which number is a specimen code which corresponds in a unique way to the recording apparatus itself.

It is to be noted that the format of a Q-frame used in practice, which is the format of the ISRC code used in practice, and the format of the RID code used in practice satisfy a standard in which one out of every 100 ±5 consecutive Q-frames is formatted in accordance with mode 3. The consecutive mode 3 Q-frames comprise the following codes in a cyclic succession: ISRC, ISRC, RID, ISRC, ISRC, TBD, etc. This means that a RID code is recorded only once per six mode 3 Q-frames, i.e. only once per 600 Q-frames, or only once per 58,800 program frames 30. Since each information frame in audio comprises 6 audio samples, while the audio is sampled at a sampling frequency of 44.1 kHz, this means that a RID code is recorded only once per 8 seconds of audio time. This is acceptable because audio recordings will hardly ever last longer than 8 seconds, while it is very unlikely that illegal copies of such short audio fragments are made on a commercial scale. However, in the case of data recording, this means that a RID code is recorded only once per 58,800 blocks of 24 recorded data bytes, i.e. once for more than 1.4 Mbyte. Since there is a need for the facility of recording data in smaller portions, the known method of recording the RID code is not suitable for data recording.

As has been illustrated in FIG. 1B, the program portion 20 of a recording 11 is preceded in data recording by four run-in blocks 21, 22, 23 and 24, and the program portion 20 of a recording 11 is followed by two run-out blocks 25 and 26. Each block has a length of 2 kbyte. The four run-in blocks 21, 22, 23 and 24 are preceded by a start-link block 28 and the two run-out blocks 25 and 26 are followed by an end-link block 29. The start-link block 28 of a recording 11 partially overlaps the end-link block 29 of the preceding recording 11.

In principle, the program portion 20 itself has an arbitrary length but, in practice, it is divided into blocks 27 each comprising 2 kbyte net of actual data. More particularly, each block 27 comprises 98 frames 30, i.e. 98*24 =2352 bytes of recorded information comprising synchronizing, addressing and error correction bits at a higher level.

The four run-in blocks 21, 22, 23 and 24 and the two run-out blocks 25 and 26 serve two important purposes. In the first place, they make an error correction possible of the first and last data blocks of the program portion 20. In fact, the error correction algorithm used extends across a plurality of consecutive blocks. To ensure that the last data block 27 of the program portion 20 can be read faultlessly, the two run-out blocks 25 and 26 are involved in the error correction algorithm. The end-link block 29, which is partly overwritten by a start-link block 28 of a subsequent recording 11, is incomplete and non-corrigible, and the last run-out block 26 will only be partly usable for recording purposes because the end-link block 29 is largely unreadable. The first run-out block 25 may possibly be read faultlessly but this is not entirely certain.

To ensure that the first data block 27 of the program portion 20 can be read faultlessly, the two last run-out blocks 23 and 24 are involved in the error correction algorithm.

The most important reason that the number of run-in blocks is larger than the number of run-out blocks is the fact that a reading apparatus which is to read the recording 11 must be adapted to the precise way in which the recording 11 has been recorded. It is, for example necessary to synchronize the clock of the reading apparatus with the written information. Before the reading apparatus has been "captured" reliably, a certain period of time elapses and in this period the relevant blocks (21, 22) are not usable for error correction; the larger number of run-in blocks now serves to compensate for this effect. The two last run-in blocks 23 and 24 are faultlessly readable with great certainty.

For said functions, i.e. error correction and capture, it is important that the run-in blocks 21–24 and the run-out blocks 25–26 are valid blocks, but the content of the information written in these blocks is not crucial. As regards said functions, these blocks can be considered as auxiliary blocks with dummy information. The present invention proposes to utilize the storage space represented by said blocks by recording "useful" information therein, for example the afore-mentioned RID code identifying the relevant recording apparatus.

In principle, it is possible to record mutually different information in the six run-in and run-out blocks, but as the distance to the program portion 20 is larger, the chance of faultless reading is smaller. Most usable are the last run-in block 24 and (perhaps to a slightly lesser extent) the first run-out block 25. However, for the sake of simplicity, it is preferable to write the same information in all of the six run-in and run-out blocks. The invention will hereinafter be elucidated with reference to recording in the last run-in block 24.

As has been explained hereinbefore, the RID code hitherto written in the Q-channel has a length of 12 characters and a total number of 58 bits recorded with a large mutual interspace in the program portion 20 of the recording 11. The same conventional RID code can be recorded in the last run-in block 24 within the scope of the present invention. An important advantage of the invention is that the last run-in block 24 does not have any location restrictions for recording any information and that the 58 bits of the standard RID code can thus be placed closer together than is done in the conventional recording method. It is preferable that some of these 58 bits, or even all of these 58 bits, are recorded one after the other, i.e. contiguously, in the last run-in block 24.

It will be evident that the storage space in a block having a length of 2 kbyte is amply sufficient to store such a RID code. Then there is even enough space left for storing the RID code several times, if desired, and/or for storing other useful information. Within the scope of the present invention it is even possible that the information recorded with reference to the relevant recording apparatus is more extensive than the conventional RID code.

In a particular embodiment, the present invention proposes the following coding. A code indicating that a valid RID code has been recorded in the block is recorded in the first five bytes (bytes 0 to 4) of the block. This code may consist of the characters "RID01". At least provisionally, the next three bytes are not used and have the content 00H.

Three alphanumerical characters corresponding to the previously mentioned manufacturer's code are recorded in the subsequent three bytes (8–10). At least provisionally, the next five bytes are not used and have the content 00H.

Two alphanumerical characters and two figures corresponding to the previously mentioned type code are recorded in the subsequent four bytes (16–19). At least provisionally, the next four bytes are not used and have the content 00H.

The previously mentioned specimen code is recorded in the form of a 20-bit number in the subsequent three bytes (24–26). The first four bits of byte 24 are equal to 0. The fifth bit of byte 24 is the MSB of said 20-bit number, while the last bit of byte 26 is the LSB of said 20-bit number. At least provisionally, the next five bytes are not used and have the content 00H.

If desired, the bytes 32–63 comprise, in alphanumerical characters, the full name of the manufacturer of the recording apparatus with which the relevant recording has been written. If this facility is not used, these bytes have the content 00H.

If desired, the bytes 64–79 comprise, in alphanumerical characters, supplementary data about the type of recording apparatus with which the relevant recording has been written. If this facility is not used, these bytes have the content 00H.

If desired, the bytes 80–95 comprise, in alphanumerical characters, supplementary data about the specimen of the recording apparatus with which the relevant recording has been written. If this facility is not used, these bytes have the content 00H.

The bytes 96–255 are not used, at least not for the time being, and have the content 00H.

The bytes 256–1023 are freely usable and the significance of the information stored here can be freely defined by the manufacturer of the recording apparatus. In this case, the recording apparatus might particularly store, for example, information relating to write parameters set during the writing process. In a later writing operation, the same writing apparatus could read this information and set the same write parameters again without a complicated test procedure being necessary to fix the optimum write parameters.

The bytes 1024–2047 are not used, at least not for the time being, and have the content 00H.

Figure 4:
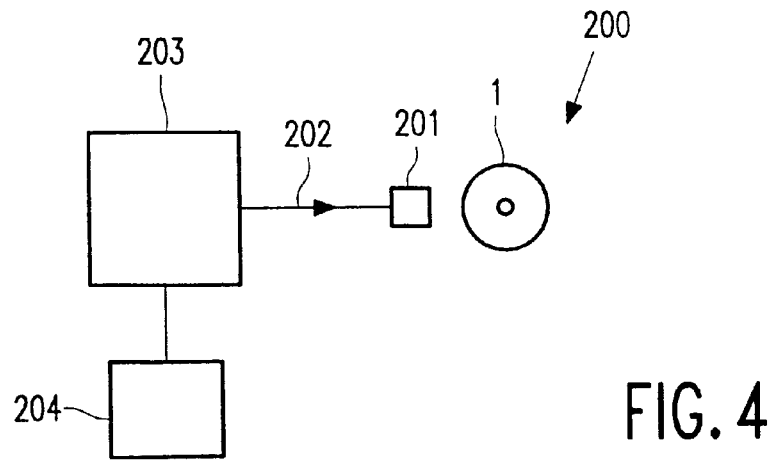
FIG. 4 shows diagrammatically a writing apparatus.

FIG. 4 shows diagrammatically a writing apparatus 200 for performing the recording method described hereinbefore. The writing apparatus 200 comprises a writing member 201 for bringing about a physical change representing the information to be recorded in the CD 1. This writing member 201 may be a standard writing member comprising, for example a laser and will not be described in greater detail.

A control member 203 generates control signals 202 for controlling the writing member 201. The control member 203 is associated with a memory 204 in which the RID code identifying the relevant writing apparatus 200 is stored. The control member 203 is adapted to generate control signals in a recording session, which control signals represent the information to be recorded of the program portion 20 of the recording 11. Prior to the control signals representing said program portion 20, the control member 203 also generates control signals defining the run-in blocks 21, 22, 23, 24, which drive signals incorporate the RID code stored in said memory 204. After the control signals representing said program portion 20, the control member 203 also generates control signals defining the run-out blocks 25, 26, which control signals incorporate the RID code stored in said memory 204.

Since the run-in and run-out blocks are associated with each individual recording 11, irrespective of the length of the program portion 20, it is ensured that information identifying the used recording apparatus with certainty is recorded during each recording session, even if the program portion 20 has a short length of only 2 kbyte.

It will also be evident that the method of recording RID information proposed by the present invention is compatible with the currently known method in the sense that both methods can be used side by side and do not interfere with each other. In practice, this means that a RID code can be written in at least one of the run-in and/or run-out blocks in accordance with the protocol proposed by the present invention and can also be written in the Q-channel in accordance with the current protocol. If the RID code must be read for control purposes, either the Q-channel or the run-in and/or run-out blocks, or both can optionally be consulted, while, in accordance with the present invention, the RID code recorded in one of the run-in and/or run-out blocks is readable to a greater extent of certainty at a short length of a recording 11. On the other hand, the conventional recording of the RID code in the Q-channel can be dispensed with if the RID code in accordance with the present invention is recorded in at least one of the run-in and/or run-out blocks and preferably in all of these blocks.

It will be evident to those skilled in the art that the protective scope of the present invention as defined in the claims is not limited to the embodiments shown and described with reference to the drawings, but that it is possible to change or modify the illustrated embodiments of the recording in accordance with the invention within the scope of the invention. For example, it is possible to write the RID code in the Q-channel of a run-in block.

It is further possible that only one run-in block is sufficient and no run-out blocks are necessary in certain systems, for example DVD, in which a different error correction method is used. It will be evident to those skilled in the art that, in such a situation, the RID code can be recorded in this single run-in block.

What is claimed is:

1. A method of digitally recording information on a suitable medium, comprising the steps of:

producing a recording during a recording session, which recording includes a program portion with the information to be recorded;

prior to recording the program portion, recording a predetermined number of run-in blocks, and/or subsequent to recording the program portion, recording a predetermined number of run-out blocks; and during the recording session, recording an identification code identifying the recording apparatus used for the relevant recording session, on the medium in at least one of the run-in blocks or run-out blocks.

2. A method as claimed in claim 1, wherein the identification code is recorded in each run-in block and run-out block.

3. A record carrier provided with at least one recording, which comprises:

a substrate;

one or more tracks having blocks of information, including:

a program portion of multiple blocks; and a predetermined number of run-in blocks positioned at the program portion prior to the program portion and/or a predetermined number of run-out blocks positioned at the program portion subsequent to the program portion, wherein at least one of the run-in blocks and/or run-out blocks includes an identification code identifying a recording apparatus used for recording the program portion.

4. A writing apparatus for digitally recording information on a suitable medium, comprising:

a writing member for bringing about a physical change in the medium, representing the information to be recorded;

a control member for controlling the writing member by means of control signals;

a memory, associated with the control member, in which a code for identifying the writing apparatus is stored;

the control member generates control signals in a recording session, which control signals represent the information to be recorded of a program portion of a recording;

the control member being also adapted to generate control signals in the recording session and prior to the control signals representing the program portion, which control signals define a predetermined number of run-in blocks, and/or to generate control signals in the recording session and subsequent to the control signals representing the program portion, which control signals define a predetermined number of run-out blocks; and the control member being also adapted to incorporate the identification code stored in the memory in the control signals which define at least one of the run-in blocks and/or run-out blocks.

5. The method of claim 1, in which the identification code is recorded in at least one run-in block and at least one run-out block.

6. The record carrier of claim 3, in which the identification code is recorded in at least one run-in block and at least one run-out block.

7. The writing apparatus of claim 1, in which the identification code is recorded in at least one run-in block and at least one run-out block.

8. The method of claim 1, in which:

the identification code is recorded in at least a last run-in block;

the identification code is recorded in at least one run-in block and at least one run-out block;

the identification code is recorded in multiple run-in blocks and/or multiple run-out blocks;

all of the run-in and run-out blocks are written in an identical manner;

the identification code uniquely identifies a particular recording apparatus used for the recording session;

at least a portion of the identification code is duplicated within the program portion;

the program code is sufficiently short that only a portion of the identification code is interleaved within the program portion;

the identification code includes a portion that identifies the manufacturer of the recording apparatus;

the identification code includes a portion that identifies a type of the recording apparatus;

the identification code is written in a Q-channel of at least one run-in and/or run-out block;

the run-in blocks and/or the run-out blocks further include information indicating an optimum write parameter used for recording of the program portion;

the medium is a compact disc or a digital video disc; and the run-in blocks include a first portion with information for synchronizing the clock of a reading apparatus and a second portion that follows the first portion and contains the identification code.

9. The record carrier of claim 3, in which:

the identification code is recorded in at least a last run-in block;

the identification code is recorded in at least one run-in block and at least one run-out block;

the identification code is recorded in multiple run-in blocks and/or multiple run-out blocks;

all of the run-in and run-out blocks are written in an identical manner;

the identification code uniquely identifies a particular recording apparatus used for recording the program portion;

at least a portion of the identification code is duplicated within the program portion;

the identification code is written in a Q-channel of at least one run-in and/or run-out block;

the program code is sufficiently short that only a portion of the identification code is interleaved within the program portion;

the identification code includes a portion that identifies the manufacturer of the recording apparatus;

the identification code includes a portion that identifies a type of the recording apparatus;

the run-in blocks and/or the run-out blocks further include information indicating an optimum write parameter used for recording of the program portion;

the medium is a compact disc or a digital video disc; and the run-in blocks include a first portion with information for synchronizing the clock of a reading apparatus and a second portion that follows the first portion and contains the identification code.

10. The writing apparatus of claim 4, in which:

the run-in blocks are recorded immediately before the program portion is recorded;

the run-out blocks are recorded immediately after the program portion is recorded;

the identification code is recorded in at least a last run-in block;

the identification code is recorded in at least one run-in block and at least one run-out block;

the identification code is recorded in multiple run-in blocks and/or multiple run-out blocks;

all of the run-in and run-out blocks are written in an identical manner;

the identification code uniquely identifies a particular recording apparatus used for the recording session;

at least a portion of the identification code is duplicated within the program portion;

the identification code is written in a Q-channel of at least one run-in and/or run-out block;

the program code is sufficiently short that only a portion of the identification code is interleaved within the program portion;

the identification code includes a portion that identifies the manufacturer of the recording apparatus;

the identification code includes a portion that identifies a type of the recording apparatus;

the run-in blocks and/or the run-out blocks further include information indicating an optimum write parameter used for recording of the program portion;

the medium is a compact disc or a digital video disc; and the run-in blocks include a first portion with information for synchronizing the clock of a reading apparatus and a second portion that follows the first portion and contains the identification code.

11. The writing apparatus of claim 4, in which: the apparatus writes multiple lead-in blocks immediately before the program portion; and at least a portion of the identification code is written in the last block of the lead-in blocks.

12. The writing apparatus of claim 4, in which the identification code uniquely identifies the particular writing apparatus.

* * * * *